United States Patent

Ban

[15] 3,652,096

[45] Mar. 28, 1972

[54] CONTROL MEANS FOR MOVING DECK FOR TAPE CARTRIDGE PLAYING APPARATUS UTILIZING PLURALITY OF ENDLESS MAGNETIC TAPE CARTRIDGES

[72] Inventor: Itsuki Ban, 829, Higashi-Oizumimachi, Nerima-ku, Tokyo-to, Japan

[22] Filed: June 15, 1970

[21] Appl. No.: 45,961

[52] U.S. Cl. ....................274/4 F

[51] Int. Cl. ....................G11b 5/00

[58] Field of Search ....................274/4

[56] References Cited

UNITED STATES PATENTS

| | | | |
|---|---|---|---|
| 3,176,580 | 4/1965 | Metz | 274/4 F |
| 3,484,055 | 12/1969 | Raine | 274/4 F |

*Primary Examiner*—Harry N. Haroian

*Attorney*—Jacobs & Jacobs

[57] ABSTRACT

Control means for moving a deck in a tape cartridge apparatus having a plurality of endless tape cartridges mounted on a movable container, the container being movable to bring the cartridges into the playing position in a predetermined sequence. Mounted on the deck are a rotary capstan for driving the tape in the cartridge in the playing position, and a magnetic head for transducing the tape. The deck is adapted to be reciprocated between a reproducing station where the capstan and the magnetic head play the cartridge in the playing position and a non-reproducing station where the play of the cartridge is ended. The deck may be retained by a first locking means in the reproducing station or by a second locking means in the non-reproducing station. The deck is moved into the non-reproducing station by the bias of a bias means when the first locking means releases retention of the deck. And, the deck is moved into the reproducing station against the bias of the bias means by a deck moving means having a frictional cam wheel rotatably driven abutting against the capstan when the second locking means releases retention of the deck.

6 Claims, 3 Drawing Figures

CONTROL MEANS FOR MOVING DECK FOR TAPE CARTRIDGE PLAYING APPARATUS UTILIZING PLURALITY OF ENDLESS MAGNETIC TAPE CARTRIDGES

BACKGROUND OF THE INVENTION

This invention relates to a tape cartridge playing apparatus utilizing a plurality of endless magnetic tape cartridges, and more particularly to control means for moving a deck which carries a rotatory capstan and a magnetic head for playing one of the cartridges in the playing position by movement of a movable container storing a plurality of the cartridges, from a reproducing station where the cartridge in the playing position is played to a non-reproducing station where the play of the cartridge is ended.

It has been common to use an electromagnetic plunger in order to control movement of the deck. On the other hand, such deck is required to provide a capstan, capstan driving means, and magnetic head and the like for playing the tape cartridge. For this reason, the deck is accordingly massive and must be moved to the extent of 20mm. Further, an electromagnetic plunger to be used would be large scaled and thus wastes much current. Such electromagnetic plunger is expensive and causes a problem that no space is provided for the tape player. The electromagnetic plunger is adapted to move the deck impactly so that unfavorable result would be given to mechanics of the apparatus. Of course, an electrical motor may be used instead of the electromagnetic plunger to move the deck. However, this requires more complex for linkage mechanism between the motor and the deck.

SUMMARY OF THE INVENTION

It is a primary object of the invention to provide novel control means for driving deck for a tape cartridge playing apparatus utilizing a plurality of endless magnetic tape cartridges, wherein the deck which carries members for playing one of the cartridges in the playing position is moved from a reproducing station where the cartridge is played to a non-reproducing station.

Another object of the invention is to provide control means for driving deck for a tape cartridge playing apparatus utilizing a plurality of endless magnetic tape cartridges, wherein movement of the deck is made by rotational force of a rotatary capstan for driving the tape in the cartridge and by the bias of bias means for urging the deck in the opposite direction of the cartridge in the playing position.

A further object of the invention is to provide control means for driving deck for a tape cartridge playing apparatus utilizing a plurality of endless magnetic tape cartridge, including a frictional cam wheel rotatable abutting against the capstan by the bias of the bias means when the deck which has been retained in the reproducing station or the non-reproducing station by locking means, is released from its retention, with rotation of the cam wheel the deck being moved by the capstan.

Yet another object of the invention is to provide control means for driving deck for a tape cartridge playing apparatus utilizing a plurality of endless magnetic tape cartridges, which requires simple construction and is less expensive to manufacture it.

These and other objects of the invention will be apparent from the following description and accompanying drawings in which:

DESCRIPTION OF THE PREFERRED EMBODIMENTS

Figure 1:
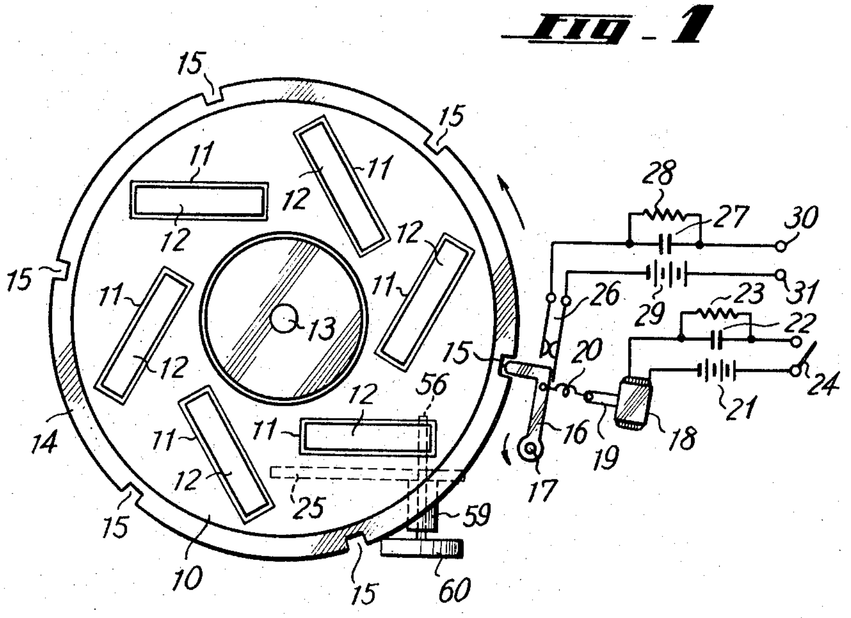
FIG. 1 is a representation schematically showing by way of example, a tape cartridge playing apparatus utilizing a plurality of endless magnetic tape cartridges, to which a deck movement control apparatus of the invention is applied.

A tape cartridge playing apparatus utilizing a plurality of endless magnetic tape cartridges is shown in FIG. 1 by way of example to employ a deck movement control apparatus according to the present invention. Numeral 10 indicates a container which has tunnels 11 storing a plurality of tape cartridges 12 and is rotatably mounted to a horizontal shaft 13. The container 10 is intended to be rotatably driven in the direction of the arrow as shown by a suitable driving device such as, for example, a spring motor (not shown), however, rotation of the container is prevented by inserting one end of a stopper lever 16 pivoted to a pin 17 into slots 15 formed on a flange 14 of the container 10 in opposition to associated tunnels 11. The stopper lever 16 is normally biased by a spring (not shown) in the direction that one end thereof is inserted into the slot 15 of the container 10. The stopper lever 16 is coupled by a spring 20 to a plunger 19 of a solenoid 18 and is adapted to move disengaging the container 10 by the solenoid when energized. The solenoid 18 is connected through a parallel connection of a condenser 22 with a resistor 23, and a switch 24 in series with a power source 21. The solenoid 18 is supplied with the current in pulse fashion by the power source 21 in response to closing of the switch 24. Thus, the stopper lever 16 is moved to disengage the container 10 in pulse manner whenever the switch 24 is closed. The container 10 is caused to be moved in the direction of the arrow as shown when the stopper lever 16 disengage the container 10 in pulse fashion, and rotation of the container is arrested by engagement of the stopper lever 16 with the adjacent slot 15. It is apparent that the container 10 is intermittently rotated at every time the switch 24 is closed thereby carrying the cartridges 12 to a predetermined playing position in succession.

The cartridges 12 are received in the container 10 in a manner that the leading edges of the cartridges project outwardly of the container 10 a rear edge of which is shown in FIG. 1. A deck is designated by numeral 25 and is provided with a reproducing member for reproducing the cartridge 12. According to the invention, as will be fully described later the deck 25 is adapted to be reciprocally moved between a reproducing station for reproduction of the cartridge 12 in the playing position and a non-reproducing station for stopping of the reproduction. When the deck 25 is moved into the non-reproducing station, the switch 24 is actuated and closed by the deck 25. In response to movement of the deck 25 to the non-reproducing station, the container 10 is rotated to move the next cartridge into the play position. During the time that the container 10 is rotated, a parallel connection of a condenser 27 with a resistor 28 and a power source 29 are connected in series with a switch 26 which has been actuated by the stopper lever 16 and maintained in open condition. Engagement of the stopper lever 16 with the slot 15 deactuates the switch 26 by the lever 26 and closes the switch to generate the pulse voltage between terminals 30,31. In other words, the container 10 is rotated to bring the next cartridge 12 into the playing position. In association therewith, the pulse voltage is generated between the terminals 30, 31 to move the deck 25 from the non-reproducing station to the reproducing station thereby performing the play of the cartridge in the play position.

A relation between the cartridge in the playing position and the deck will be described hereinafter by reference to FIG. 2.

The cartridge 12 includes a generally rectangular housing in which an endless magnetic tape 32 helically wound in a conventional manner, a tape guide 33, and a pinch roller 34 are stored. The cartridge 12 is held by the guides 35, 36 and 37 in the tunnel 11 of the container 10. The guide 37 is mounted to the free end of a leaf spring 38 one end of which is immovably fixed and presses a notch of the side wall of the cartridge 12 under the influence of the leaf spring.

Numeral 40 is a base plate provided in a player housing (not shown) of the tape cartridge player. Four pins 41 are mounted on the base plate. The deck 25 is slidably mounted by elongaged slots 42 in the deck and the pins 41 on the base plate 40. Rings 43 are mounted to the respective pins 41 at upper end thereof to limit upward movement of the deck 25 with respect to the base plate 40. The deck 25 is adapted to be rightwardly moved by a tension springs 44. In FIG. 2, the deck is shown as being held in the reproducing station when a projection 47 of the deck 25 engages a stopper lever 45 pivoted to a pin 46 connected to the base plate 40. The stopper lever 45 is normally biased in the direction of the arrow as shown by a spring (not shown) to maintain engageable relation with the projection 47 or 48 of the deck 25. The stopper lever 45 is coupled by a spring 51 to a plunger 50 of a solenoid 49 fixed to the base plate 40 and is pivoted by the solenoid 49 to disengage the projection 47 or 48 of the deck 25 when the solenoid 49 is energized. The solenoid 49 is connected by a switch 53 to a power source 52 and energized by the power source when the switch 53 is manually operated and closed. The solenoid 49 is connected by terminals 54, 55 to the terminals 30, 31 (FIG. 1) and is energized in pulse fashion by the power source 29 (FIG. 1) when the cartridge 12 to be played is brought to the playing position due to rotation of the container 10, namely, exchange of the cartridge to be played is completed. The deck 25 is provided with a capstan 56, a magnetic head 57, an endmark detector or sensing means 58 as reproducing member for the cartridge 12 in the playing position. The capstan 56 is rotatably supported by a suitable bearing 59 (FIG. 1) provided under the deck 25 and upwardly extends from the deck through a hole (not shown) in the deck 25. A flywheel 60 is attached to the lower end of the capstan. The capstan 56 is adapted to be rotated when the flywheel 60 is belt driven by a motor (not shown) provided under the deck 25. The base plate 40 is cut away to have a portion opposite to the deck 25, as indicated by the dotted lines, to permit of provision of the capstan 56 and the motor and the like under the deck 25. The magnetic head 57 is mounted on the deck 25 and is adapted to move for selection a record track to be played out of a plurality of the tracks by shifting means not shown as it constitutes no invention. The shifting means (not shown) is provided to move the magnetic head 57 by one step in response to passage of an endmark (not shown) of conductive foil through the endmark detector 43.

A pair of guide members 61 are spaced to each other on the deck 25 to receive the cartridge 12. With this arrangement, the cartridge 12 is clamped at forward edge thereof by the guide members 61 as shown in FIG. 2 when the deck 25 is in the reproducing station whereby a relative position of the deck 25 with the cartridge 12 is ensured. When the deck 25 is in the reproducing station, the capstan 56 is pressed through the tape 32 against the pinch roller 34 within the cartridge 12 thereby driving the tape 32 across the endmark detector 58 and the magnetic head 57. Pressure force between the pinch roller 34 and the capstan 56 is derived from forward motion of the cartridge 12 when the guide 37 depresses the inclined wall of the notch 39 in the cartridge.

A moving means for moving the deck 25 from the reproducing station to the non-reproducing station and vice versa includes a rubber covered frictional eccentric cam wheel 62 rotatable by the capstan 56. The cam wheel 62 is rotatably mounted to an axis 65 connected to the other end of a bracket 63 one end of which is fixed by screws 64 to the base plate 40. A flat portion 66 is formed on the cam wheel 62 at the minimum eccentric portion thereof.

Now, the switch 53 is manually closed temporarily to energize the solenoid 49 temporarily to move the stopper lever 45 disengaging the projection 47 of the deck 25. As a result, the deck 25 is released from engagement with the stopper lever 45 and is rightward moved from the reproducing station by the bias of the tension spring. At this moment, the capstan 56 abuts against the cam wheel 62 to arrest movement of the deck 25 by the tension springs 44. Pressure force is generated between the capstan 56 and the cam wheel 42 under the influence of the tension springs 44 to rotate the cam wheel 62 in the direction of the arrow as shown. With rotation of the cam wheel 62, the deck 25 is gradually and rightward moved by the tension spring 44. When the cam wheel 62 is rotated through about half revolution from the position shown in FIG. 2 to allow the flat portion 66 of the cam wheel to be opposed to the capstan, the projection 48 engages the stopper lever 45 to arrest movement of the deck 25. The deck 28 is arrested by the stopper lever 45 to diminish pressure force between the capstan 56 and the cam wheel 62 derived from the tension springs 44 whereby the cam wheel 62 is prevented from rotating thereof where the flat portion 66 is opposed to the capstan 56. In response to movement of the deck into the non-reproducing station where the projection 48 engages the stopper lever 45, the switch 24 (FIG. 1) is closed as set forth above to energize the solenoid 18 in pulse fashion thereby moving the stopper lever 16 to disengage the container 10. Rotation of the container 10 to bring the next cartridge into the play position allows the stopper lever 16 to engage the slot 15 of the container 10 to stop rotation of the container 10 to thus produce the pulse voltage between the terminals 30, 31 thereby energizing the solenoid 49. When the solenoid 49 is energized and the stopper lever 45 is moved to disengage the projection 48, the deck 25 is slightly and rightward moved from the non-reproducing station by the bias of the tension spring 44 to allow the capstan to abut against the flat portion 66 of the cam wheel 62. Rotation of the cam wheel 62 by the capstan 56 moves the deck 25 gradually in the leftward direction. During the time that the cam wheel 62 is rotated until the maximum eccentric portion thereof is opposed to the capstan, the deck 25 is moved until the projection 47 is positioned at the left side of the stopper lever 45 at its tip end. Further rotation of the cam wheel 62 to reverse movement of the deck 25 allowing it to assume the rightward direction. At this moment the projection 47 engages the stopper lever 45 to arrest movement of the deck 25. When the deck 25 is retained by the stopper in the reproducing station to diminish pressure force between the capstan 56 and the cam wheel 62 by the tension springs 44 thereby stopping rotation of the cam wheel 62, as best shown in FIG. 2. Movement of the deck 25 from the non-reproducing station into the reproducing station initiates the play of the cartridge 12 which has been in the playing position.

As described in the above, by operatively closing the switch 53 the deck 25 is moved from the reproducing station into the non-reproducing station and thereafter the container 10 is rotated to exchange the cartridge to be played. And, exchange of the cartridge is completed to move the deck 25 from the non-reproducing station into the reproducing station thereby initiating the next cartridge's play.

Figure 2:
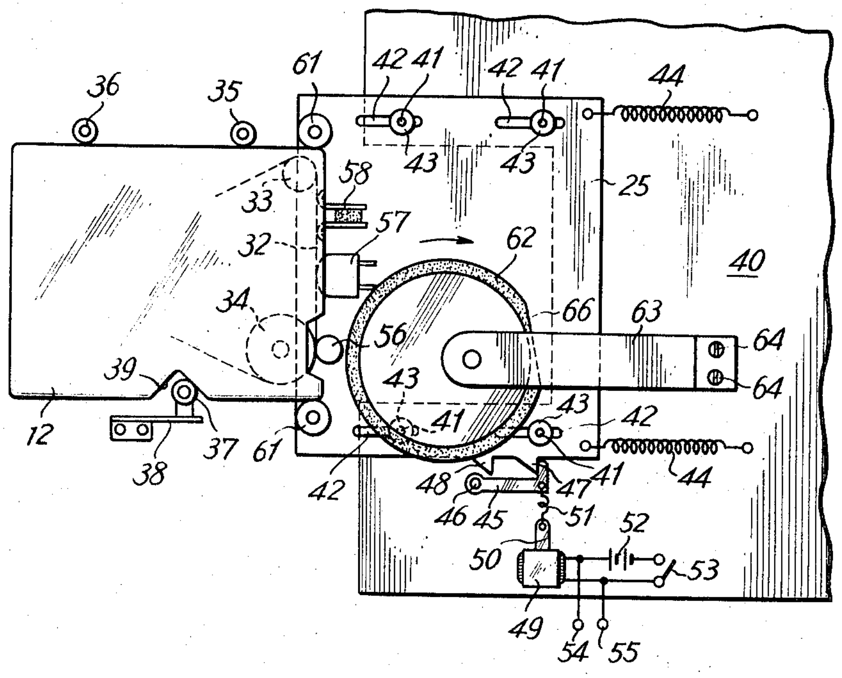
FIG. 2 is a representation schematically showing another embodiment of the deck movement control apparatus of the invention.
Figure 3:
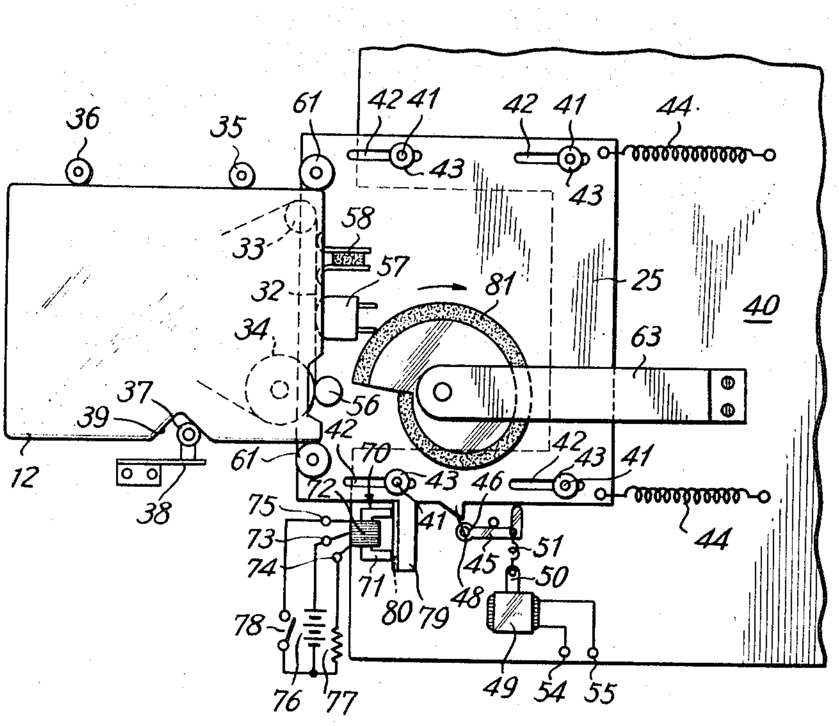
FIG. 3 is a representation schematically showing alternative embodiment of the deck movement control apparatus of the invention.

FIG. 3 shows an alternative embodiment of the deck movement control apparatus according to the invention, wherein similar numerals are used to illustrate like parts in FIG. 2. The deck movement control apparatus in FIG. 3 is almost similar to that shown in FIG. 2 except means for retaining the deck 25 in the reproducing station. The retainer means for retaining the deck 25 in the reproducing station includes an electromagnet 70 fixed to the base plate 40. The electromagnet 70 includes an U-shaped core 71 and a coil 72 wound to the core 71. The coil 72 is provided with an intermediate tap 73. A power source 76 and a resistor 77 are connected in series with the one end 74 of the coil 71 and the intermediate tap 73 while the power source 76 and a normal opened switch 78 are connected in series with the intermediate tap 73 and the other end 75 of the coil 71. A bent portion 80 of a projection 79 of mild steel plate is provided on the deck 25 at one side thereof is opposed to the magnetic circuit open end of the core 71 of the electromagnet 70. As shown in FIG. 3, the current from the power source 76 is applied through the resistor 77 to the coil 72 of the electromagnet 70 to produce the magnetic flux in the coil 72 whereby the core 71 of the electromagnet 70 attracts the bent portion 80 of the deck 20 to retain the deck 25 in the reproducing station.

Now, the switch 78 is manually and operatively closed, and the magnetic flux generated from the coil 72 is temporarily diminished by the current from the power source 76 via the switch 78 to the coil 72 so that the electromagnet 70 has no more magnetic attractive force for the bent portion 80 of the deck 25. As a result, the deck 25 is released from its retention and is rightward moved by the bias of the tension springs 44 from the reproducing station into the non-reproducing station where the projection 48 engages the end of the stopper lever 45. In the embodiment shown in FIG. 2, the capstan 56 abuts against the cam wheel 62 on the way that the deck 25 is moved from the reproducing station into the non-reproducing station. On the other hand, in the embodiment shown in FIG. 3, the capstan 56 does not abut against the frictional wheel 81 on the way that the deck 25 is moved from the reproducing station into the non-reproducing station since the frictional wheel 81 is different from the cam wheel 62 in configuration and the minimum eccentric portion is opposed to the capstan 56.

In response to movement of the deck 25 into the non-reproducing station, the switch 24 (FIG. 1) is opened to rotate the container 10 to exchange the cartridge to be played. In response to completion of exchange of the cartridge, the solenoid 49 is energized in pulse fashion to move the stopper lever 45 to disengage the projection 48. Thus, the deck 25 is slightly and rightward moved from the non-reproducing station by the bias of the tension springs 44 to allow the capstan 56 to abut against the minimum eccentric portion of the cam wheel 81. This causes the cam wheel 81 to rotate in the direction of the arrow as shown to move the deck 25 leftward against the bias of the springs 44. Where the cam wheel 81 is rotated through about one revolution and the maximum eccentric portion slidably contacts the capstan 56, the bent portion 80 of the deck 25 is close to the magnetic circuit open end of the core 71 of the electromagnet 70. Therefore, the bent portion 80 is attracted to the electromagnet 70 by the magnetic flux generated from the coil 72 by the current supplied from the power source 76 via the resistor 77. After the deck 25 has been retained by the electromagnet 70 in the reproducing station, the maximum eccentric portion of the cam wheel 81 is away from the capstan to keep the cam wheel 81 away from the capstan 56 to thus stop rotation of the cam wheel 81.

As mentioned hereinbefore, the deck 25 is released from its retention of the electromagnet 70 and then is automatically moved from the reproducing station into the non-reproducing station. After the cartridge to be played is exchanged, the deck is returned from the non-reproducing station into the reproducing station to play the cartridge in the playing position.

The tape player to which the present invention is applied may not be limited to that as shown in FIG. 1 and may take an arrangement that the cartridges are successively moved in the playing position by reciprocating such a container storing a plurality of the cartridges.

Although the invention has been described with reference to specific embodiments, it is apparent that the invention is not to be limited to the embodiments as illustrated, and, accordingly, changes and variations may be made without departing from the spirit and scope of the invention as defined in the appended claims.

What is claimed is:

1. In a tape cartridge playing apparatus having a plurality of endless tape cartridges mounted on a container, the container being movable to bring the cartridge into the playing position in a predetermined sequence, control means for moving a deck into relationship far and near to a tape cartridge in the play position comprising a reciprocally movable deck, a rotatary capstan and a capstan driving means on said deck, the capstan being adapted to forcedly abut on a pinch roller in one of the tape cartridges held in the play position in response to movement and location of the container supporting the plurality of endless tape cartridges; a magnetic head on said deck; bias means for normally urging said deck in the opposite direction of a cartridge in the play position; a first locking means for retaining said deck against the bias of said bias means in the reproducing station where the capstan abuts against the pinch roller in the cartridge in the play position to transport a tape in the cartridge in the play position across the magnetic head; a second locking means for retaining said deck movable into the predetermined non-reproducing station where said capstan and said magnetic head is away from the tape and said pinch roller in the cartridge in the play position by operating said first locking means to release retention of said deck, said container being moved to bring the next cartridge into the playing position when said deck is in the non-reproducing station whereby the second locking means releases retention of said deck; a deck moving means for moving said deck against the bias of said bias means from the non-reproducing station into the reproducing station, said deck moving means including a frictional cam wheel rotatable about a fixed point, said capstan being pressed against the cam wheel when said deck is moved by the bias of said bias means from the non-reproducing station so that the cam wheel is rotated by the capstan, with rotation of the cam wheel said deck being moved by said capstan against the bias of said bias means to move said deck into the reproducing station, in response to retention of said first locking means pressure force between the cam wheel and the capstan derived from said bias means is diminished to stop rotation of the cam wheel.

2. Control means in accordance with claim 1, wherein said first locking means comprises a first projection formed on said deck, a stopper lever movably provided to a fixed portion adjacent said deck and normally urged in a position for maintaining engageable relation with the first projection, a solenoid coupled to the stopper lever and allowing the stopper lever to move to disengage the first projection when energized, and a control circuit for energizing the solenoid when the play of the cartridge in the play position is ended, and wherein said second locking means comprises a second projection formed spacedly with respect to the first projection, the stopper lever and the solenoid common to the first locking means, and a control circuit for energizing the solenoid to move the stopper lever to disengage the second projection in response to introduction of one of the cartridges into the play position by movement of said container.

3. Control means in accordance with claim 1, wherein said first locking means further includes an electromagnet for retaining a portion of said deck moved into the reproducing station in the reproducing station with its magnetic attraction, and a control circuit for controlling operation of the electromagnet, and wherein said second locking means further includes a projection formed on said deck, a stopper movably provided to a fixed portion adjacent said deck and having engageable relation with the projection when said deck is moved into the non-reproducing station, a solenoid coupled to the stopper lever and allowing the stopper lever to move to disengage the projection when energized, and a control circuit for energizing the solenoid in response to introduction of one of the cartridges into the play position by movement of said container.

4. Control means in accordance with claim 2, wherein said frictional cam wheel is an eccentric cam and is rotated through half revolution by said capstan when said deck is moved from the reproducing station into the non-reproducing station or the non-reproducing station to the reproducing station.

5. Control means in accordance with claim 4, wherein said eccentric cam wheel has a flat portion at the minimum eccentric portion thereof.

6. Control means in accordance with claim 3, wherein said frictional cam wheel is shaped and dimensioned so that said deck is moved from the non-reproducing station into the reproducing station through about one revolution of said frictional cam wheel by means of said capstan.

* * * * *